Figure 1:
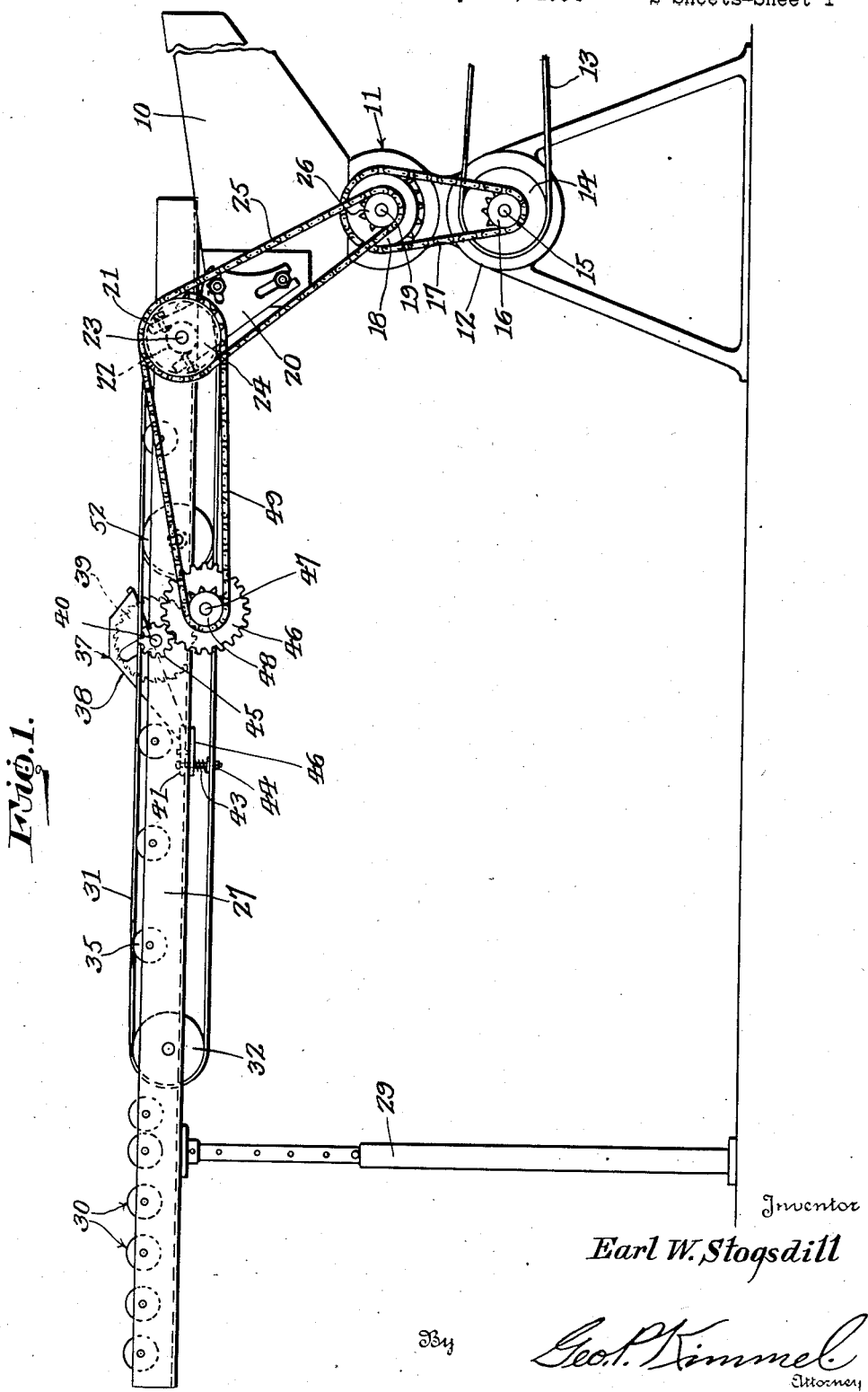

May 21, 1935.  E. W. STOGSDILL  2,002,419
OIL WELL CEMENT MIXER
Filed Sept. 7, 1934  2 Sheets-Sheet 1

Inventor
Earl W. Stogsdill
By Geo. P. Kimmel
Attorney

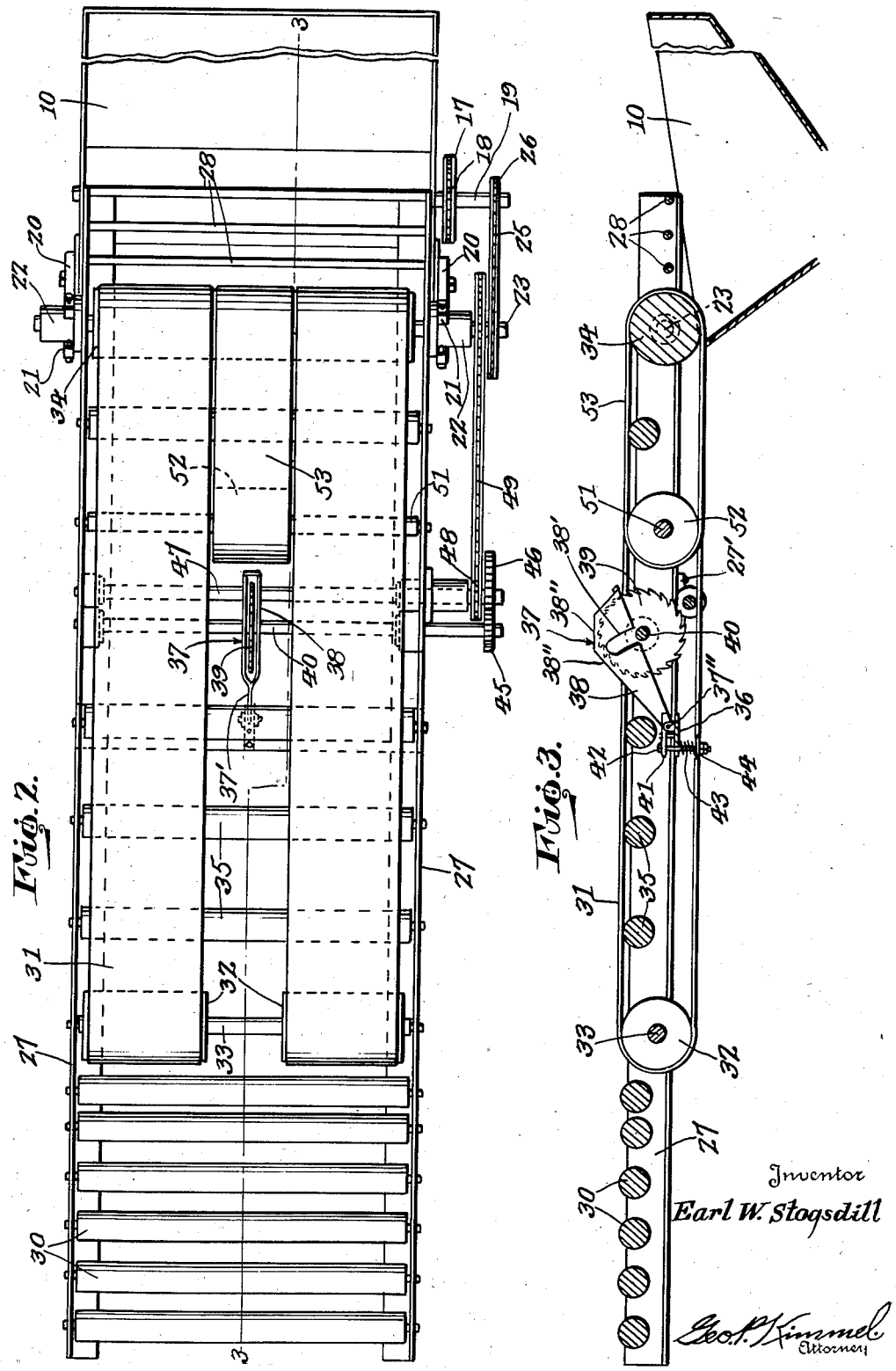

Patented May 21, 1935

2,002,419

UNITED STATES PATENT OFFICE 2,002,419

OIL WELL CEMENT MIXER

Earl W. Stogsdill, Lynwood, Calif.

Application September 7, 1934, Serial No. 743,143

14 Claims. (Cl. 214—1)

My present invention relates generally to the feeding of cement to cement mixers in oil well and various other work, my primary object being the provision of a cement feeding arrangement which may be driven in synchronism with a mixer which it feeds, and is automatic in its operation to the extent of opening and dumping the cement sacks, the full sacks being fed thereto by hand and the empty sacks also removed by hand.

It is a further object of my invention to provide a simple, comparatively inexpensive apparatus which may be easily set up and taken down, which will be uniformly effective in use, which will cut open the sacks without danger to the operators, and which will insure feed of cement as it is needed.

In the accompanying drawings, illustrating my present invention and forming a part of this specification, Figure 1 is a side elevation of my improved apparatus, Figure 2 is a top plan view thereof, and Figure 3 is a vertical longitudinal section taken therethrough substantially on line 3—3 of Figure 2.

Referring now to these figures, I propose a feeder including an upper hopper 10 above a pair of feed roll casings 11 and 12, the feed rolls within which may be of any suitable structure, driven by a belt 13 from any suitable source of power which may be the source of power of the mixer to which the feeder delivers cement.

The belt 13 engages a pulley 14 on the shaft 15 of the lower feed roll, and this shaft also carries a sprocket wheel 16 connected by a sprocket chain 17 to a sprocket wheel 18 on the shaft 19 of the upper feed roll.

The sides of the hopper 10 are provided with adjustably bolted bearing plates or brackets 20 which present upper bifurcated portions 21 adapted to receive the bearing thimbles 22 of a conveyor shaft 23 having a sprocket wheel 24 connected by a sprocket chain 25 with a second sprocket wheel 26 on the shaft 19 of the upper feed roll.

The shaft 23 is mounted through the forward portions of the side bars 27 of a conveyor frame, the forward extremities of which side bars extend above the mouth of the hopper 10 and are connected by a series of rigid cross bars or slats 28 constituting a skeleton or open support onto which the open sacks are dropped to dump their contents into the hopper.

The forward portion of the conveyor frame is thus supported by virtue of the bearing connections of its shaft 23 with the brackets 20 of the hopper 10, and the rear end of this frame is supported by sectional adjustable legs 29 beneath the rear portions of the side bars 27 so that inclination of the conveyor frame may be readily controlled.

Between the side bars, and journalled in connection therewith, at their rear ends, are a series of idler rollers 30 which form a receiving table for the full sacks of cement dumped thereon and fed forwardly by hand, onto the rear portions of a pair of laterally spaced endless conveyor belts 31.

The rear ends of these belts 31, adjacent to the forward idler roller 30, travel around belt rolls 32 on the rear conveyor shaft 33 and the forward ends thereof travel around the side portions of a single long belt roll 34 on the forward conveyor shaft 23 through which the belts are driven.

Between the frame side rails or bars 27, idler rollers 35 are journalled beneath the upper stretches of the belt 31 for supporting the same, and below and approximately midway with respect to the lower stretches of the belts 31 is arranged a flat cross bar 36 having its ends secured to the lower edges of the rails 27. Extended forwardly from the bar 36 and spaced rearwardly from the upper stretches of the belts 31, as well as being spaced from the side edges of said stretches and arranged in the path of travel of the under side of the bags of cement conveyed by the upper stretches of the belts 31 is a depressible normally upwardly inclined sack support or track element 37 which includes a shank 37' having its rear end arranged over and pivotally connected with bar 36, as at 37''. The forward end of shank 37' merges into the vertical center of the rear end of a substantially oblong upstanding hollow head 38. The latter is open at its top and bottom and formed in its sides with inverted semi-oval shaped cutouts 38'. The top edge of the head 38 has oppositely disposed downwardly inclined portions 38'' which extend towards the ends of the head 38.

The rear end of shank 37' is provided with an arm 41 which is attached to a stem 42 depending through the bar 36. The lower end of stem 42 carries a head 43. Interposed between bar 36 and head 43, as well as surrounding the stem 42 is a coiled spring 43 normally tending for element 37 to assume the position shown in Figure 3.

The rails 27 have depending therefrom a pair of parallel spaced bearings 27' in which is journaled a rotatable shaft 40 for operating a circular saw 39. The latter and its operating shaft are arranged forwardly of bar 36. The saw 39 is arranged between the belts 31 and extends above and depends below the stretches of the latter. The cutouts 38' provide clearances for shaft 40 when element 37 is depressed. The upper portion of saw 39 is arranged within head 38, and the normal position of the latter, with respect to saw 39, is as shown in Figures 1 and 3. As a sack of cement moves towards the saw 39 it will travel upon and be supported at the transverse center of its under side by the element 37. When the sack engages the stem of the element 37 it will depress the latter. On a further forward travel of the sack over the head 38 of element 37, the head 38 will position a portion of the sack to be cut by the saw. On a further forward movement of the sack it will pass off of head 38 whereby the spring 43 will then act to elevate the element 37. If a follower bag is not on the conveyer, the element 37 will be shifted to the position shown in Figures 1 and 3 to extend above the saw and when in such position will act as a shield.

The saw shaft 40 has one of its ends extended from a bearing 27'. The said end carries a gear 45 which is in mesh with a substantially larger gear 46. The latter gear is secured upon a cross shaft 47 mounted in bearings attached to the lower surfaces of the side rails 27 and also carrying a sprocket wheel 48 connected by a sprocket chain 49 with a sprocket wheel 50 on the forward conveyor shaft 23.

Immediately in front of the saw shaft 40 there is journalled through the side rails 27 an intermediate conveyor shaft 51, upon the central portion of which is a conveyor roll 52 located between the conveyors 31 and receiving therearound the rear portion of a conveyor belt 53 whose forward portion is around the central portion of the forward conveyor roll 34, it being thus plain that the conveyor 53 works forwardly from the saw between, and in the same plane with, the conveyors 31.

In operation, the usual paper cement sacks dumped onto the idler rollers 30, are fed forwardly by hand, crosswise of the conveyor frame, onto the rear ends of the side conveyors 31, by which they are fed past the saw 39. As the sacks reach the saw their weight depresses the element 37 and the rotating saw cuts centrally into and through the lower half of the sack just before it reaches the central conveyor 53 which supports and assists in conveying the sacks as well as arresting discharge of cement until it passes over the forward ends of the conveyors and is dropped onto the cross rods 28. Here the cement freely falls into the hopper 10 and the emptied sacks are cast aside by the operator.

It is thus obvious the operations mentioned can be carried out readily and easily and for the most part, automatically according to and timed with, the needs, and particularly as to the slitting and opening of the cement sacks, may be accomplished without danger to the operators.

What I claim is:

1. In an apparatus of the character described, the combination of a cement feeder having a hopper, a cement sack conveyor leading to the feeder and consisting of a pair of spaced apart parallel conveyor belts, a frame in which said belts operate having at the discharge end thereof a portion extending over the hopper and provided with cross rods forming an open sack holder, sack splitting means intermediate the ends of said belts and upstanding between the same, and a third conveyor belt extending from said splitting means to the discharge ends of the first belts to support the split portion of each sack during its movement to the said hopper.

2. In an apparatus for the purpose set forth, a hopper, an open sack support arranged at the mouth of the hopper, a horizontally disposed conveyer for supporting sacks of cement thereupon in a sidewise manner transversely thereof for conveying them to be deposited in a like manner upon said support, and means intermediate the ends of the conveyer for slitting the under sides of the sacks of cement during the conveying of the latter to said support, said support being disposed forwardly of and transversely with respect to the discharge end of the conveyer.

3. In an apparatus for the purpose set forth, a hopper, a horizontally disposed frame, supporting means for one end of the frame, said frame at one end being connected to and supported from the hopper, an open sack support carried by the frame and arranged at the mouth of the hopper, a horizontally disposed conveyer for supporting sacks of cement thereupon in a sidewise manner transversely thereof for conveying them to be deposited in a like manner upon said sack support, said conveyer being arranged in said frame, and means supported from the frame, positioned intermediate the ends of the conveyer for slitting the undersides of the sacks during the conveying of the latter, said sack support being disposed forwardly of and transversely with respect to the discharge end of the conveyer.

4. In an apparatus for the purpose set forth, a hopper, a horizontally disposed frame supported at one end of said hopper, supporting means for the other end of the frame, a skeleton support for slit sacks of cement, said support being positioned on the frame and arranged at the mouth of the hopper, a horizontally disposed conveyer means carried by the frame for supporting sacks of cement deposited thereupon in a sidewise manner transversely thereof for conveying them to be deposited in a like manner lengthwise of said support, means for operating said conveyer means, and means intermediate the ends of said conveyer means for slitting the under side of the sacks of cement during the conveying of the latter to the sack support.

5. In an apparatus for the purpose set forth, a hopper, an open sack support arranged at the mouth of the hopper, a horizontally disposed conveyer for supporting sacks of cement thereupon in a sidewise manner transversely thereof for conveying them to be deposited in a like manner upon said support, and means intermediate the ends of the conveyer for slitting the under sides of the sacks of cement during the conveying of the latter to said support, said support being disposed forwardly of and transversely with respect to the discharge end of the conveyer, said conveyer including a travelling element for receiving the slit sacks prior to the depositing of the sacks upon the sack support and for preventing discharge from the slit sacks until they are deposited upon the sack support.

6. In an apparatus for the purpose set forth, a hopper, a horizontally disposed frame, supporting means for one end of the frame, said frame at one end being connected to and supported from the hopper, an open sack support carried by the frame and arranged at the mouth of the hopper, a horizontally disposed conveyer for supporting sacks of cement thereupon in a sidewise manner transversely thereof for conveying them to be deposited in a like manner upon said sack support, said conveyer being arranged in said frame, and means supported from the frame, positioned intermediate the ends of the conveyer for slitting the under sides of the sacks during the conveying of the latter, said sack support being disposed forwardly of and transversely with respect to the discharge end of the conveyer, said conveyer including a travelling element for receiving the slit sacks prior to the depositing of the sacks upon the sack support and for preventing discharge from the slit sacks until they are deposited upon the sack support.

7. In an apparatus for the purpose set forth, a hopper, a horizontally disposed frame supported at one end of said hopper, supporting means for the other end of the frame, a skeleton support for slit sacks of cement, said support being positioned on the frame and arranged at the mouth of the hopper, a horizontally disposed conveyer means carried by the frame for supporting sacks of cement deposited thereupon in a sidewise manner transversely thereof for conveying them to be deposited in a like manner lengthwise of said support, means for operating said conveyer means, and means intermediate the ends of said conveyer means for slitting the under side of the sacks of cement during the conveying of the latter to the sack support, said conveyer means including a travelling element for receiving the slit sacks prior to the depositing of the sacks upon the sack support and for preventing discharge from the slit sacks until they are deposited upon the sack support.

8. In an apparatus for the purpose set forth, a hopper, an open-sack support arranged at the mouth of the hopper, a horizontally disposed conveyer for supporting sacks of cement thereupon in a sidewise manner transversely thereof for conveying them to be deposited in a like manner upon said support, means intermediate the ends of the conveyer for slitting the under sides of the sacks of cement during the conveying of the latter to said support, said support being disposed forwardly of and transversely with respect to the discharge end of the conveyer, said conveyer including a travelling element for receiving the slit sacks prior to the depositing of the sacks upon the sack support and for preventing discharge from the slit sacks until they are deposited upon the sack support, and a depressible sack supporting element arranged rearwardly of and in proximity to said travelling element.

9. In an apparatus for the purpose set forth, a hopper, a horizontally disposed frame, supporting means for one end of the frame, said frame at one end being connected to and supported from the hopper, an open sack support carried by the frame and arranged at the mouth of the hopper, a horizontally disposed conveyer for supporting sacks of cement thereupon in a sidewise manner transversely thereof for conveying them to be deposited in a like manner upon said sack support, said conveyer being arranged in said frame, means supported from the frame, positioned intermediate the ends of the conveyer for slitting the under sides of the sacks during the conveying of the latter, said sack support being disposed forwardly of and transversely with respect to the discharge end of the conveyer, said conveyer including a travelling element for receiving the slit sacks prior to the depositing of the sacks upon the sack support and for preventing discharge from the slit sacks until they are deposited upon the sack support, and a depressible sack supporting element arranged rearwardly of and in proximity to said travelling element.

10. In an apparatus for the purpose set forth, a hopper, a horizontally disposed frame supported at one end of said hopper, supporting means for the other end of the frame, a skeleton support for slit sacks of cement, said support being positioned in the support and arranged at the mouth of the hopper, a horizontally disposed conveyer means carried by the frame for supporting sacks of cement deposited thereupon in a sidewise manner transversely thereof for conveying them to be deposited in a like manner lengthwise of said support, means for operating said conveyer means, means intermediate the ends of said conveyer means for slitting the under side of the sacks of cement during the conveying of the latter to the sack support, said conveyer means including a travelling element for receiving the slit sacks prior to the depositing of the sacks upon the sack support and for preventing discharge from the slit sacks until they are deposited upon the sack support, and a depressible sack supporting element arranged rearwardly of and in proximity to said travelling element.

11. In an apparatus for the purpose set forth, a vertically disposed hopper, an open slit cement sack support positioned at the mouth of the hopper, an inner and a pair of outer conveyer belts for conveying sacks of cement to be deposited upon said support, said belts arranged in parallel relation, a cutter element for slitting the under side of the sacks, as they travel towards the sack support, said inner belt being of less length than said outer belts and arranged forwardly of and in proximity to said element, and said inner belt acting to prevent discharge from the slit sacks until they are deposited upon said support.

12. In an apparatus for the purpose set forth, a vertically disposed hopper, an open slit cement sack support positioned at the mouth of the hopper, an inner and a pair of outer conveyer belts for conveying sacks of cement to be deposited upon said support, said belts arranged in parallel relation, a cutter element for slitting the under side of the sacks as they travel towards the sack support, said inner belt being of less length than said outer belts and arranged forwardly of and in proximity to said element, said inner belt acting to prevent discharge from the slit sacks until they are deposited upon said support, and a depressible sack support having means for positioning a part of the under side of a sack to be acted upon by said element.

13. In an apparatus for the purpose set forth, a vertically disposed hopper, an open slit cement sack support positioned at the mouth of the hopper, an inner and a pair of outer conveyer belts for conveying sacks of cement to be deposited upon said support, said belts arranged in parallel relation, a cutter element for slitting the under side of the sacks, as they travel towards the sack support, said inner belt being of less length than said outer belts and arranged forwardly of and in proximity to said element, and said inner belt acting to prevent discharge from the slit sacks until they are deposited upon said support, a frame carrying said belts, a depressible sack support and a cutter element, adjustable supporting means for one end of said frame, means for connecting the other end of said frame to said hopper, and means for operating said belts.

14. In an apparatus for the purpose set forth, a horizontally disposed structure including sack conveyers, an open support for receiving sacks from the conveyers and a sack slitting means intermediate the ends of the conveyers, a pair of spaced supporting structures for and adjustably connected to the said horizontal structure, one of said supporting structures including a hopper arranged directly below said open support.

EARL W. STOGSDILL.